United States Patent Office 2,895,974
Patented July 21, 1959

2,895,974

COMPOSITION OF MATTER

Everett N. Case, Homewood, Ill., assignor to Sinclair Refining Company, New York, N.Y., a corporation of Maine No Drawing. Application February 9, 1955
Serial No. 487,207

4 Claims. (Cl. 260—413)

My invention relates to novel organic hydroxy acids obtained by the reaction of oleic acid and formaldehyde.

The novel organic hydroxy acids of my invention are obtained by reacting oleic acid and formaldehyde in the presence of a sulfuric acid catalyst while controlling the temperature at about 30 to 60° C. Various organic hydroxy acids are obtained by the reaction. The novel organic hydroxy acids obtained include a high melting point white solid hydroxy acid characterized by hexane and benzene insolubility, a second type which is a liquid hydroxy acid characterized by hexane and benzene solubility, and a third type which is a liquid hydroxy acid characterized by hexane insolubility and benzene solubility.

The oil soluble organic hydroxy acids of my invention are particularly valuable in the preparation of greases, particularly lithium greases. The greases prepared using the acids have good stability and consistency and high dropping points. The acids of my invention are also useful as demulsifiers for crude oil either as acids or in the form of polyesters made by self-esterification of the acids or the oxyalkylated product of the polyesters or acids. The alkali metal salts of the acids are useful as detergents. The esters, amides, nitriles and similar derivatives of the acids are useful as flotation agents. The acids are also useful as polymer components, for example, to modify polymeric esters of the alkyd type or for incorporation into a linear polyester and then effecting cross linking of the ester by means of the second or third hydroxyl group of the acids. Also, the metal soaps of the acids are useful as gelling agents in the production of gelled fuels such as Napalm or Hydrofrac gels.

The organic hydroxy acids of my invention are prepared by reacting oleic acid and formaldehyde in the presence of a sulfuric acid catalyst while controlling the temperature from about 30 to 60° C. A convenient procedure is to add formaldehyde to oleic acid with stirring and then add sulfuric acid. Preferably, the formaldehyde is in the form of its polymer paraformaldehyde. The reaction is exothermic and suitable means are provided for controlling the temperature within the desired range. Also, the temperature can be controlled by controlling the rate of addition of sulfuric acid. Preferably, the temperature is controlled between about 35 to 50° C. The sulfuric acid is separated from the crude reaction product by hydrolysis and the remaining organic residue may be used as such for grease manufacture or separated by any suitable method into the component hydroxy acids.

In general, proportions of oleic acid to formaldehyde to sulfuric acid of about 1:2:0.5–2 moles are used in the reaction. Generally, all of the types of hydroxy acids are formed in the reaction and are present in the reaction product, from which they can be separated by a number of methods. Under particular reaction conditions, however, the reaction product may predominate in a particular type of acid. For example, the use of a molar ratio of about 1:2:2 of oleic acid to formaldehyde to sulfuric acid tends to produce a hydroxy acid product predominantly insoluble in aliphatic hydrocarbons such as hexane while the use of a ratio of about 1:2:1 tends to produce a hydroxy acid product predominantly soluble in such aliphatic hydrocarbons. It appears that the use of high temperatures, long reaction time, large excess of formaldehyde or large amounts of sulfuric acid lead to the formation of a product that is not aliphatic hydrocarbon soluble. Thus, a product predominating in the solid dihydroxy acid would be formed by the use of a molar ratio of oleic acid to formaldehyde to sulfuric acid of about 1:2:1, a product predominating in the second type of acid would be formed by the use of a ratio of about 1:2:0.5, and a product predominating in the trihydroxy third type of acid would be formed by the use of a ratio of about 1:2:2.

The sulfuric acid is separated from the crude reaction product by any suitable method, for example, by washing with water or water and steam. Preferably, the reaction product is washed with water at a temperature of about 70 to 80° C. Washing at higher temperatures may cause undesirable esterification of the hydroxy acids. Alternatively, the reaction product may be saponified to break down self-esterified materials and then acidified to free the acids and water washed. Preferably, the acidified soaps are water washed in a solvent solution as this gives the best ester-free product. The temperature should not be over about 80° C.

The organic layer comprising the novel hydroxy acids remaining after separation of the sulfuric acid may be further washed to remove any traces of sulfuric acid and, if desired, purified by saponification to break down self-esterified material and acidification to free the acids. The acid reaction product may be separated into the component hydroxy acids by a number of methods from the crude product or from the saponified and acidified product, for example, by solvent crystallization or solvent fractionation. When the component acids are to be separated from the crude product, they are preferably saponified before purification.

The solid hydroxy acid formed by the reaction of oleic acid and formaldehyde can be separated from the reaction product by any suitable method. For example, the acid can be separated by crystallization. The acid crystallizes from the reaction mixture causing the crude acids to be a semi-solid. Preferably, solvent crystallization is used and and aliphatic hydrocarbon solvent such as n-hexane is added to the crude product resulting in the dissolving of most of the liquid acids leaving a semi-solid mass containing largely the solid acid. The solids can be separated by filtration or by further solvent extraction. The crude solid acids can be purified by washing with an aliphatic hydrocarbon solvent, e.g., hexane, followed by recrystallization from a non-reactive organic solvent such as acetone or acetonitrile. Solvents such as acetone or acetonitrile precipitate the acid in hard, dense, white crystals which are easily filtered to separate the solvent. Aliphatic hydrocarbon solvents, e.g., hexane, and aromatic solvents, e.g., benzene, are not suitable for recrystallization as the solid acids are not appreciably soluble in aliphatics and have a strong gelling tendency in aromatics. Solvents such as alcohols or acids are not suitable as they react with the hydroxy acids. The solid acid is characterized by its insolubility at room temperature in hexane, benzene and acetonitrile and its solubility in mineral oil. The acid has a hydroxyl number of about 250, an iodine number of about 0.9 to 3 and a melting point of about 111 to 118° C.

A second type of acid can be separated from the reaction product. For example, the acid can be separated by solvent fractionation, for example, with hexane and acetonitrile, of the acid product from the reaction. This acid is a low freezing point liquid characterized by its solubility in hexane and benzene as distinguished from the insoluble high melting point solid acid. The acid is soluble in mineral oil. The acid has a hydroxyl number of about 156 and an iodine number of about 11.6.

The third type of acid also can be separated from the reaction product by various methods. For example, the acid can be separated by solvent fractionation of the acid product; suitable solvents include hexane and acetonitrile. This acid is a low freezing point liquid characterized by its insolubility in hexane and its solubility in benzene and acetonitrile. The acid is not soluble in mineral oil. The use of large quantities of sulfuric acid. The acid has a tion produces the oil insoluble acid. The acid has a characteristically high hydroxyl number of about 180 to 204 and an iodine number of about 8 to 15.

The novel hydroxy acids of my invention will be further illustrated by reference to the following examples.

In the examples the following general procedure was used for the reaction of oleic acid and formaldehyde. A three neck flask equipped with a stirrer, thermometer, and dropping funnel is used for the reaction. Oleic acid is charged to the flask and the required amount of formaldehyde polymer is then added with very rapid stirring. When the formaldehyde has been thoroughly dispersed in the oleic acid, the sulfuric acid (concentrated) is added slowly. The reaction is exothermic causing the temperature of the reactants to rise. The temperature is controlled by immersing the reaction flask in an icewater bath and by controlling the rate of addition of the sulfuric acid. The sulfuric acid is added as rapidly as possible with temperature control. The time of addition is generally 1.5 to 2 hours. The reaction mixture is then stirred for about 6 hours with little or no cooling required to maintain the temperature.

The following day the reaction mixture is stirred with an equal volume of water and heated with live steam to about 95° C. At this point a sulfuric acid layer separates. This layer is drawn off and the organic layer again stirred with an equal volume of water at 95° C. The wash water is separated and discarded. The third such water wash leaves the organic acids relatively free of sulfuric acid. The last traces of sulfuric acid are difficult to remove since the organic acids dissolve water while hot, and at room temperature are so viscous that the dilute acid droplets will not separate. When the acids are to be saponified the last traces of sulfuric acid need not be removed.

The washed acids are saponified by adding to them approximately twice their volume of water containing 15 to 20 percent excess over the theoretical quantity of sodium hydroxide. The resulting solution is heated at the boiling point for 24 hours. The soap solution is then reacted with 15 to 20 percent $H_2SO_4$ with vigorous stirring at 70 to 80° C. It is desirable to add less than the required amount of acid and remove the resultant sodium sulfate solution because the large amount of salt formed causes the soaps to be salted out of solution and are therefore not neutralized. More water is then added and the final acidification is made with dilute aqueous sulfuric acid. It is necessary to keep the acids at 70 to 80° C. because they solidify at lower temperatures making washing extremely difficult. Whenever the acids were subsequently heated for extractions or other separations it was found that removal of the small amount of dilute sulfuric acid left in solution in the organic acids was desirable. If this acid is not removed it catalyzes re-esterification of the organic acids when they are heated. The most convenient way of removing this acid was by addition of a small amount of sodium hydroxide in an amount just sufficient to form a small amount of soap as indicated by a cloudy wash water.

*Example I*

2,538 grams of oleic acid were reacted with formaldehyde in the presence of concentrated sulfuric acid in a molar ratio of 1:2:1. The temperature of reaction was maintained at 38 to 40° C.

The crude acid product after washing to remove sulfuric acid had the following analyses: iodine number 9.5, acid number 96.7, saponification number 162.0, hydroxyl number 89. This crude acid mixture was saponified to split the esters and the free acids obtained by acidification. Hexane was added to the semi-solid mass giving a precipitate of a solid white acid, and a solution of hexane soluble acids.

The precipitated solid acid was purified by recrystallization from acetone to give a substantially pure acid fraction. Analysis of the solid acid showed that it had an acid number of 166.1, a saponification number of 165.9, an hydroxyl number of 250 by standard procedure and 177.6 by the $BF_3$ method and an iodine number of 0.9, and contained 68.91 percent carbon, 11.18 percent hydrogen. The acid had a melting point of 113 to 118° C. On remelting the melting point was 111 to 115° C. The infrared spectrogram of the acid was sharp and clean indicating a high degree of purity. A doublet adsorption peak was observed at 10.75 microns which apparently is associated with crystal structure. Heating of the sample changed only one member of the doublet. This indicates that there may be two crystalline forms or geometrical isomers, one of which is more reactive than the other.

The solid acid fraction was essentially insoluble at room temperature in hexane and benzene. The solid acid was quite insoluble in cold aromatic solvents, such as benzene, and hot solutions on cooling gelled the aromatic solvents.

*Example II*

The hexane soluble portion from Example I contained acids having the following analyses: acid number 163.1, saponification number 172.7, hydroxyl number 147 and iodine number 16.3. The liquid acid fraction had a very low freezing point and was soluble in hexane and benzene in contrast to the solid acid of Example I which had a high melting point and which was insoluble in hexane and benzene. Infrared spectrogram analysis also showed differences between the two acids.

*Example III*

2,820 grams of oleic acid were reacted with formaldehyde in the presence of concentrated sulfuric acid in a molar ratio of 1:2:2. The temperature of reaction was controlled at 38 to 40° C. The crude product was saponified.

The crude potassium soaps were separated by extraction with acetonitrile and the most soluble portion was acidified.

Analysis of the acidified acetonitrile soluble acid fraction showed that the liquid acid had an acid number of 152.7, a saponification number of 168.9, a hydroxyl number of 181.7 and an iodine number of 11.9. The liquid acid was insoluble in hexane, in contrast to the hexane soluble liquid acids of Example II, as was the solid acid of Example I but had a very low freezing point as distinguished from the solid acid which has a high melting point. The liquid acid was also very soluble in benzene in contrast to the solid acid of Example I. The hydroxyl numbers of the liquid acid are significantly high as compared to the liquid acid of Example II indicating either more hydroxyl groups or a different type.

*Example IV*

The solid crude acid of Example I having the following analysis: acid number 164.1, saponification number 162.0, hydroxyl number 250 and iodine number 2.9, was utilized to prepare a lithium grease. The lithium grease contained 12.0 percent soap, 0.0 percent moisture, 0.016 free alkali and 1.5 percent anti-oxidants.

The grease tested as follows:

ASTM Penetration:
- Unworked _____ 355
- Worked—
  - 60 strokes _____ 365
  - 100,000 strokes _____ 420+
- ASTM dropping point, ° F. _____ 429
- Wheel bearing test (ASTM Test No. D-1263-53T, 40 m.p.h., 220° F.):
  - Rating _____ Pass
  - Micropenetration—
    - Before _____ ____
    - After _____ 141
    - After repack _____ 166
- Norma-Hoffman oxidation test:
  - P.s.i. drop—
    - 100 hrs. _____ 3
    - 500 hrs. _____ 14
- Copper corrosion test (MIL-G-10924):
  - Rating _____ Pass
  - P.s.i. drop _____ 1

The results show that the lithium grease prepared with the solid hydroxy acid of my invention is of good work stability and consistency. The lithium grease showed a gain of 55 points in penetration between 60 and 100,000 strokes as compared to the specification of 20 points gain for a conventional lithium grease made with 12-hydroxy stearic acid. The dropping point of 429° F. was very high as compared to the expected dropping point of 380° F. for a lithium grease made from 12-hydroxy stearic acid. Another lithium grease prepared from the same solid hydroxy acid had an even higher dropping point of 446° F.

*Example V*

The liquid hydroxy acid of Example II was utilized to prepare a lithium grease. The lithium grease contained 12.5 percent soap, 0.10 percent moisture, 0.031 percent free alkali and 0.5 percent anti-oxidant.

The grease tested as follows:

ASTM penetration:
- Unworked _____ 305
- Worked—
  - 60 strokes _____ 315
  - 10,000 strokes _____ 338
  - 100,000 strokes _____ 364
- ASTM dropping point, ° F. _____ 365.5
- ASTM wheel bearing test (ASTM Test No. D-1263-53T, 40 m.p.h., 220° F.):
  - Rating _____ Pass—Good
  - Micropenetration—
    - Before _____ 142
    - After _____ 129
    - After repack _____ 153
- Norma-Hoffman oxidation test:
  - P.s.i. drop—
    - 100 hrs. _____ 6
    - 500 hrs. _____ 18

The results show that the grease is of good stability and consistency. The grease showed a high gain of 49 penetration points between 60 and 100,000 strokes.

I claim:

1. A method for the production of organic hydroxy acids which comprises reacting oleic acid and formaldehyde in the presence of a sulfur acid catalyst in a molar ratio of oleic acid to formaldehyde to sulfuric acid of about 1:2:0.5–2 and in the substantial absence of water while controlling the temperature at about 30 to 60° C.

2. The method of claim 1 in which the molar ratio of oleic acid to formaldehyde to sulfuric acid is about 1:2:1.

3. The method of claim 1 in which the molar ratio of oleic acid to formaldehyde to sulfuric acid is about 1:2:0.5.

4. The method of claim 1 in which the molar ratio of oleic acid to formaldehyde to sulfuric acid is about 1:2:2.

References Cited in the file of this patent

UNITED STATES PATENTS

| Number | Name | Date |
|---|---|---|
| 988,032 | Rossner et al. | Mar. 28, 1911 |
| 2,492,201 | Swern et al. | Dec. 27, 1949 |
| 2,578,647 | Stiteler et al. | Dec. 11, 1951 |
| 2,651,616 | Mathews et al. | Sept. 8, 1953 |
| 2,764,604 | Rockett | Sept. 25, 1956 |

UNITED STATES PATENT OFFICE
CERTIFICATE OF CORRECTION

Patent No. 2,895,974                                                                       July 21, 1959

Everett N. Case

It is hereby certified that error appears in the printed specification of the above numbered patent requiring correction and that the said Letters Patent should read as corrected below.

Column 3, lines 20 and 21, should read as shown below instead of as in the patent:

-- use of large quantities of sulfuric acid in the condensation produces the oil insoluble acid. The acid has a --;

column 6, line 25, for "sulfur" read -- sulfuric --.

Signed and sealed this 12th day of April 1960.

(SEAL)
Attest:

KARL H. AXLINE                                                  ROBERT C. WATSON
Attesting Officer                                              Commissioner of Patents